United States Patent Office 3,050,446
Patented Aug. 21, 1962

3,050,446
FERMENTATION OF CHLORTETRACYCLINE AND DEMETHYLCHLOROTETRACYCLINE
Joseph Jacob Goodman, Nanuet, N.Y., assignor to American Cyanamid Company, New York, N.Y., a corporation of Maine
No Drawing. Filed July 28, 1960, Ser. No. 45,795
6 Claims. (Cl. 195—80)

This invention relates to the production of chlortetracycline and demethylchlortetracycline (7-chloro-6-demethyltetracycline) by fermentation and more particularly is concerned with an improved method of increasing the production of these antibiotics and of decreasing the production of tetracycline and demethyltetracyline in such fermentations.

It has been known for some time that microorganisms of the species *Streptomyces aureofaciens,* which produce chlortetracycline in a medium containing chloride ions, also produce small quantities of tetracycline in the same medium. The concomitant production of tetracycline may be objectionable when chlortetracycline is the principal product sought to be produced. Generally, while specification standards permit small quantities of tetracycline to be present in specification quality chlortetracycline, the presence of any sizable quantities of tetracycline is objectionable. Also, the presence of these two antibiotics in any sizable amounts in the fermentation mash involves difficult problems of separation in the refining or extraction procedures. It is possible, of course, to extract the two antibiotics from the fermentation mash and by selective refining procedures to effect a separation of the antibiotics. However, the refining procedures for effecting separation of the antibiotics are not without some difficulty and they usually involve some loss in total antibiotic potency. Moreover, tetracycline, which in those instances where chlortetracycline is the principal product of the fermentation, may be considered a contaminant and is customarily discarded or allowed to degrade since it is generally not present in sufficient quantity to warrant the expense of a separate purification procedure to bring it up to sepecification standards and this, of course, also entails a loss in total antibiotic potency.

Substantially the same situation prevails in the commercial production of demethylchlortetracycline. Demethylchlortetracycline and demethyltetracycline are members of a new family of tetracycline antibiotics which are described and claimed in United States Patent to Jerry Robert Daniel McCormick et al. No. 2,878,289. The demethyltetracyclines therein described are produced by certain mutant strains of *Streptomyces aureofaciens* derived from the chlortetracycline-producing *S. aureofaciens* A-377 soil isolate described in United States Patent to Duggar, No. 2,482,055 and deposited at the Northern Regional Research Laboratory, Peoria, Illinois as NRRL 2209. The new demethyltetracycline-producing strains are derived by treatment of A-377 with mutagenic agents. Cultures of the new demethyltetracycline-producing strains of *S. aureofaciens* are on deposit at the American Type Culture Collection, Washington, D.C., under ATCC accession numbers 12551, 12552, 12553 and 12554.

Demethylchlortetracycline, as compared to the well-known broad-spectrum antibiotic tetracycline, singularly achieves far greater antibiotic activity against susceptible organisms with far less drug; it has strikingly greater stability in body fluids; and it has enhanced resistance to degradation and a low rate of renal clearance, all supporting high levels of antibiotic activity for extended periods.

In the production of demethylchlortetracycline with mutagenic strains it has been found that small quantities of demethyltetracycline are also produced even when the medium contains a high level of chloride ions so as to favor the production of demethylchlortetracycline. As in the production of chlortetracycline, the presence of demethyltetracycline also involves difficult problems of separation. Hence, any method that results in the increased production of demethylchlortetracycline and in the lessened production of demethyltetracycline would be of extreme value.

The present invention is based upon the discovery that it has been found that copper is essential to the biosynthesis of chlortetracycline and demethylchlortetracycline. Hence, the addition of copper to such fermentations in small, carefully controlled quantities tends to further the production of chlortetracycline and/or 7-chloro-6-demethyltetracycline as the case may be, and to decrease the production of tetracycline and/or demethyltetracycline which are usually produced at the same time. By the addition of copper to the fermentation at certain definite levels, it has been found that only a relatively small amount of tetracycline or demethyltetracycline, as the case may be, is produced; so little, in fact, that it becomes unnecessary to effect a separation of these antibiotics from the principal product of the fermentation.

Any convenient source of copper may be used. Preferably, I employ any water-soluble salt of copper, such as copper sulfate preferably as the hydrate $CuSO_4.5H_2O$. Other copper salts such as the nitrate, acetate, sulfate, chloride, lactate, tartrate and citrate may similarly be employed.

The amount of copper that is added to the fermentation is a factor of some importance in that sufficient copper must be added to effect the desired decrease in tetracycline and demethyltetracycline production and yet above a certain level copper is decidedly toxic to the microorganism and the total antibiotic production falls off. In general, it has been found that where chlortetracycline production is concerned, from about 50 parts per million to about 250 parts per million of copper sulfate or equivalent is added to the fermentation medium. Larger amounts may be added, however, and particularly with a cottonseed flour containing medium it has been found that such strong fermentation media require considerably more copper. With such a medium and particularly a demethylchlortetracycline-containing medium it has been found that it is possible to add as much as 900–1000 parts per million of copper sulfate or equivalent. Therefore, in its broader aspects, the present invention contemplates the addition of a copper salt to a fermentation medium in an amount ranging from about 30 to about 1000 parts per million.

The conditions of the fermentation are generally the same as for the presently known methods of producing chlortetracycline by fermentation. That is, the fermentation medium contains the usual nutrients and mineral substances. Suitable nutrient substances which may provide those necessary substances include starch, dextrose, cane sugar, glucose, molasses, cottonseed flour, soybean meal, peanut meal, yeast, meat extracts, peptone, ammonium sulfate, urea, corn steep liquor, distillers solubles, fish meal and other conventional substances. The inorganic salts include such things as calcium carbonate, ammonium sulfate, ammonium chloride, and the various trace elements such as manganese, cobalt, zinc, copper, iron and the like. Generally, it is preferred to use a medium rich in chloride ion also as higher yields of the chlorinated antibiotics are thereby obtained.

The other general conditions of the fermentation such as hydrogen ion concentration, temperature, time, rate of aeration, preparation of the inoculum, sterilization, inoculation and the like are conventional and may be similar to those for the production of chlortetracycline shown in U.S. patent to Duggar No. 2,482,055 and for the production of demethylchlortetracycline shown in U.S. patent to McCormick et al. No. 2,878,289.

So far as the production of chlortetracycline is concerned, this aspect of the present invention is not particularly concerned with any specific microorganisms except to the extent that it is concerned with those microorganisms that produce chlortetracycline and tetracycline by fermentative biosynthesis. Insofar as is presently known, all such microorganisms are of the genus Streptomyes. The species *S. aureofaciens,* which produces chlortetracycline in fermentation media in which chloride ions are present as well as numerous natural and induced mutants is, of course, preferably used and such microorganisms will, of course, also produce tetracycline when deprived of chloride ions. A number of other chlotetracycline-producing microorganisms and tetracycline-producing microorganisms have been mentioned in the patent literature as alleged distinct species of Streptomyces such as *S. viridifaciens, S. sayamaensis, S. feofaciens,* and still others. The published morphological data on these microorganisms is insufficient conclusively to determine whether or not they are new species or merely strains of *S. aureofaciens.* Regardless of this, however, this aspect of the present invention is not predicted upon the selection of a particular species of microorganism so long as that microorganism will produce both chlortetracycline and tetracycline.

With respect to the production of demethylchlortetracycline, selected mutant strains of a demethylchlortetracycline-producing strain of *S. aureofaciens* must, of course, be used and typical strains are described in the aforesaid McCormick et al. patent.

The recovery of the chlortetracycline from the fermentation liquor is conventional and need not be described as numerous methods for recovering chlortetracycline from fermentation liquors have already been published. For recovering demethylchlortetracycline, the recovery procedures described in the aforesaid McCormick et al. patent are preferably used.

The invention will be described in greater detail in conjunction with the following specific examples.

EXAMPLE 1

A chlortetracycline fermentation medium containing a large amount of chloride ion was made up as follows:

| | |
|---|---|
| Starch _____grams per liter__ | 55 |
| Corn steep liquor _____do____ | 25 |
| $CaCO_3$ _____do____ | 9 |
| $(NH_4)_2SO_4$ _____do____ | 5 |
| $NH_4Cl$ _____do____ | 1.5 |
| Cottonseed meal _____do____ | 5 |
| $FeSO_4.7H_2O$ _____milligrams per liter__ | 60 |
| $MnSO_4.4H_2O$ _____do____ | 50 |
| $ZnSO_4.7H_2O$ _____do____ | 100 |
| $CoCl_2.6H_2O$ _____do____ | 5 |

To this medium were added, in separate runs, varying amounts of copper sulfate hydrate salt $CuSO_4.5H_2O$. The media were dispensed in appropriate amounts into flasks, sterilized, inoculated with a vegetative inoculum of *S. aureofaciens* (Strain S-77) and incubated at 26.5° C. on a rotary shaker for 96 hours. They were then assayed for their chlortetracycline and tetracycline contents. The results obtained are reported in the table below.

Table 1

| $CuSO_4.5H_2O$ p.p.m. | CTC (γ/ml.) | TC (γ/ml.) | Percent TC |
|---|---|---|---|
| 0 | 6,500 | 930 | 12.5 |
| 75 | 7,000 | 770 | 9.9 |
| 125 | 7,150 | 710 | 9.0 |
| 150 | 7,350 | 610 | 7.7 |
| 200 | 7,300 | 550 | 7.0 |
| 400 | 980 | 100 | -------- |

It will be seen from the above table that the addition of copper acts to increase the chlortetracycline production and to decrease the tetracycline production. Somewhat above 200 parts per million of copper sulfate, however, the copper is toxic to the organism and the total antibiotic production falls off.

EXAMPLE 2

The procedure of Example 1 was repeated except that different levels of copper sulfate were used. The results obtained are set forth in the table below.

Table 2

| $CuSO_4.5H_2O$ p.p.m. | CTC (γ/ml.) | TC (γ/ml.) | Percent TC |
|---|---|---|---|
| 0 | 8,100 | 630 | 7.2 |
| 55 | 8,150 | 650 | 7.4 |
| 110 | 7,850 | 450 | 5.4 |
| 120 | -------- | -------- | -------- |
| 150 | 7,850 | 470 | 5.6 |

EXAMPLE 3

The procedure of Example 1 was repeated and the following results were obtained.

Table 3

| $CuSO_4.5H_2O$ p.p.m. | CTC (γ/ml.) | TC (γ/ml.) | Percent TC |
|---|---|---|---|
| 0 | 6,850 | 800 | 10.4 |
| 100 | 6,850 | 635 | 8.5 |

EXAMPLE 4

The procedure of Example 1 was repeated and the following results were obtained.

Table 4

| $CuSO_4.5H_2O$ p.p.m. | CTC (γ/ml.) | TC (γ/ml.) | Percent TC |
|---|---|---|---|
| 0 | 6,900 | 660 | 8.7 |
| 100 | 7,050 | 590 | 7.7 |
| 200 | 6,600 | 410 | 5.8 |

EXAMPLE 5

The procedure of Example 1 was repeated and the following results were obtained.

Table 5

| $CuSO_4.5H_2O$ p.p.m. | CTC (γ/ml.) | TC (γ/ml.) | Percent TC |
|---|---|---|---|
| 0 | 7,400 | 420 | 5.4 |
| 150 | 7,900 | 360 | 4.4 |
| 200 | 7,900 | 350 | 4.2 |
| 250 | 7,400 | 300 | 3.9 |
| 300 | 5,800 | 245 | 4.1 |

EXAMPLE 6

A fermentation medium was prepared which contained the following ingredients:

| | Grams per liter |
|---|---|
| Starch _____ | 55 |
| Corn steep liquor _____ | 25 |
| $CaCO_3$ _____ | 8 |
| $(NH_4)_2SO_4$ _____ | 5 |
| $NH_4Cl$ _____ | 1 |
| Cottonseed flour _____ | 5 |

To this medium was added, in separate runs, varying amounts of copper sulfate hydrate salt $CuSO_4.5H_2O$. This media were dispensed in appropriate amounts into flasks, containing 2% (v./v.) of lard oil, sterilized, inoculated with a vegetative inoculum of a demethylchlortetracycline-producing strain of *S. aureofaciens* (Strain E-475) and incubated at 26.5° C. on a rotary shaker for 144 hours. They were then assayed for their demethylchlortetracyline contents. The results obtained are reported in the table below.

*Table 6*

| $CuSO_4.5H_2O$ p.p.m. | Demethylchlor-tetracycline $\gamma$/ml. |
|---|---|
| 0 | 1,480 |
| 10 | 1,195 |
| 50 | 1,205 |
| 100 | 1,765 |
| 150 | 1,700 |

It will be seen from the above table that the addition of copper acts to increase the demethylchlortetracyline production.

EXAMPLE 7

The procedure of Example 6 was repeated, using a demethylchlortetracycline-producing strain of *S. aureofaciens* (Strain E-1311) and the following results were obtained.

*Table 7*

| $CuSO_4.5H_2O$ p.p.m. | Demethylchlor-tetracycline $\gamma$/ml. | Demethyl-tetracycline $\gamma$/ml. | Percent demethyl-tetracycline |
|---|---|---|---|
| 0 | 1,000 | 560 | 36 |
| 10 | 1,080 | 555 | 35 |
| 100 | 1,445 | 485 | 25 |

EXAMPLE 8

The procedure of Example 7 was repeated except that incubation was carried out at 26.5° C. for 24 hours, then at 24° C. for an additional 120 hours. Test results were as follows:

*Table 8*

| $CuSO_4.5H_2O$ p.p.m. | Demethylchlor-tetracycline $\gamma$/ml. | Demethyl-tetracycline $\gamma$/ml. | Percent demethyl-tetracycline |
|---|---|---|---|
| 0 | 1,710 | 610 | 26 |
| 10 | 1,770 | 590 | 25 |
| 100 | 2,050 | 500 | 20 |

EXAMPLE 9

The procedure of Example 7 was repeated except that incubation was at 25° C. for 144 hours. Test results were as follows:

*Table 9*

| $CuSO_4.5H_2O$ p.p.m. | Demethylchlor-tetracycline $\gamma$/ml. |
|---|---|
| 0 | 1,740 |
| 100 | 1,840 |

EXAMPLE 10

A fermentation medium was prepared which contained the following ingredients:

| | Grams per liter |
|---|---|
| Starch | 43.0 |
| Corn steep liquor | 25.0 |
| $CaCO_3$ | 7.5 |
| $(NH_4)_2SO_4$ | 5.6 |
| $NH_4Cl$ | 1.0 |
| Cottonseed flour | 5.0 |
| Corn flour | 27.0 |
| $MnSO_4$ | 0.080 |
| $CoCl_2.5H_2O$ | 0.005 |

To one portion of this fermentation medium was added 10 p.p.m. of $CuSO_4.5H_2O$ while another portion was retained as a control. The media were dispensed in appropriate amounts into flasks containing 2% (v./v.) of lard oil, sterilized, inoculated with a vegetative inoculum of *S. aureofaciens* (Strain E-1311) then incubated at 26.5° C. for 24 hours followed by incubation at 24° C. for 120 hours, that is, until harvest. The contents of the flasks were assayed for demethylchlortetracycline and demethyltetracycline with the following results:

*Table 10*

| $CuSO_4.5H_2O$ p.p.m. | Demethylchlor-tetracycline $\gamma$/ml. | Demethyl-tetracycline $\gamma$/ml. | Percent demethyl-tetracycline |
|---|---|---|---|
| 0 | 1,975 | 800 | 29 |
| 100 | 2,035 | 610 | 23 |

EXAMPLE 11

A comparative fermentation was performed using the media shown below:

| | Grams per liter | |
|---|---|---|
| | A | B |
| Starch | 55 | 35 |
| Corn steep liquor | 25 | |
| $CaCO_3$ | 8 | 3.5 |
| $(NH_4)_2SO_4$ | 5 | |
| $NH_4Cl$ | 1 | 1 |
| Cottonseed flour | 5 | 15 |
| Yeast | | 5 |
| Dried meat solubles | | 10 |
| $MnCl_2.4H_2O$ | | 0.005 |
| $ZnSO_4.7H_2O$ | | 0.050 |

To portions of medium A and medium B were added 100 p.p.m. of $CuSO_4.5H_2O$, while other portions were retained as controls. The media were dispensed in appropriate amounts into flasks containing 2% (v./v.) of lard oil, sterilized, inoculated with a vegetative inoculum of *S. aureofaciens* (Strain E-1311) and incubated on a rotary shaker at 26.5° C. for the first 24 hours followed by incubation at 24° C. for an additional 120 hours. At harvest (144 hours) the fermentation mashes were assayed, with the following results:

*Table 11*

| | A | | B | |
|---|---|---|---|---|
| $CuSO_4.5H_2O$ p.p.m. | Demethyl-chlortetra-cycline $\gamma$/ml. | Demethyl tetra cycline $\gamma$/ml. | Demethyl-chlortetra-cycline $\gamma$/ml. | Demethyl-tetra cycline $\gamma$/ml. |
| 0 | 2,025 | 725 | 1,900 | 470 |
| 100 | 2,325 | 615 | 2,625 | 200 |

EXAMPLE 12

A fermentation medium was prepared which contained the following ingredients:

| | Grams per liter |
|---|---|
| Starch | 30 |
| CaCO$_3$ | 5 |
| NH$_4$Cl | 1 |
| Cottonseed flour | 30 |
| Yeast | 1 |
| NaNO$_3$ | 2 |

To this medium were added, in separate runs, varying amounts of CuSO$_4$.5H$_2$O. The media were dispensed in appropriate amounts into flasks containing 2% (v./v.) of lard oil, sterilized, inoculated with a vegetative inoculum of S. aureofaciens (Strain E–1311) and incubated on a rotary shaker at 25° C. for 144 hours. The harvest mashes assayed with the following results:

*Table 12*

| CuSO$_4$.5H$_2$O p.p.m. | Demethylchlor-tetracycline $\gamma$/ml. | Demethyl-tetracycline $\gamma$/ml. |
|---|---|---|
| 0 | 2,430 | 475 |
| 50 | 2,710 | 490 |
| 100 | 2,480 | 420 |
| 200 | 2,420 | 115 |

EXAMPLE 13

A fermentation medium was prepared which contained the following ingredients:

| | Grams per liter |
|---|---|
| Starch | 45.0 |
| CaCO$_3$ | 10.5 |
| NH$_4$Cl | 1.5 |
| Cottonseed flour | 45.0 |
| Yeast | 1.5 |

To this medium were added, in separate runs, varying amounts of CuSO$_4$.5H$_2$O. The media were dispensed in appropriate amounts into flasks containing 3% (v./v.) of lard oil, sterilized, inoculated with a vegetable inoculum of S. aureofaciens (Strain ED–1723) and incubated on a rotary shaker at 25° C. for 168 hours. Harvest mash assays were as follows:

*Table 13*

| CuSO$_4$.5H$_2$O p.p.m. | Demethylchlor-tetracycline $\gamma$/ml. | Demethyl-tetracycline $\gamma$/ml. | Percent demethyl-tetracycline |
|---|---|---|---|
| 50 | 4,340 | 1,920 | 31 |
| 150 | 4,635 | 1,370 | 23 |
| 200 | 4,510 | 1,350 | 24 |
| 300 | 4,080 | 1,235 | 24 |

EXAMPLE 14

A fermentation medium was prepared which contained the following ingredients:

| | Grams per liter |
|---|---|
| Starch | 51.0 |
| CaCO$_3$ | 11.9 |
| NH$_4$Cl | 1.7 |
| Cottonseed flour | 51.0 |
| Yeast | 1.7 |

To this medium were added, in separate runs, varying amounts of CuSO$_4$.5H$_2$O. The media were dispensed in appropriate amounts into flasks containing 3% (v./v.) of lard oil, sterilized, inoculated with a vegetative inoculum of S. aureofaciens (Strain ED–2047) and incubated on a rotary shaker at 25° C. for 160 hours. Harvest mash assays were as follows:

*Table 14*

| CuSO$_4$.5H$_2$O p.p.m. | Demethylchlor-tetracycline $\gamma$/ml. | Demethyl-tetracycline $\gamma$/ml. | Percent demethyl-tetracycline |
|---|---|---|---|
| 100 | 4,225 | 1,845 | 31 |
| 150 | 4,930 | 1,830 | 28 |
| 200 | 4,830 | 1,750 | 27 |
| 300 | 4,980 | 1,550 | 24 |

EXAMPLE 15

A fermentation medium was prepared which contained the following ingredients:

| | Grams per liter |
|---|---|
| Starch | 30 |
| CaCO$_3$ | 7 |
| NH$_4$Cl | 1 |
| Soybean oil meal | 30 |
| Yeast | 1 |

To this medium were added, in separate runs, varying amounts of CuSO$_4$.5H$_2$O. The media were dispensed in appropriate amounts into flasks containing 3% (v./v.) of lard oil, sterilized, inoculated with a vegetative inoculum of S. aureofaciens (Strain ED–2047) and incubated on a rotary shaker at 25° C. for 160 hours. Harvest mash assays were as follows:

*Table 15*

| CuSO$_4$.5H$_2$O p.p.m. | Demethylchlor-tetracycline $\gamma$/ml. | Demethyl-tetracycline $\gamma$/ml. | Percent demethyl-tetracycline |
|---|---|---|---|
| 50 | 2,570 | 1,415 | 35 |
| 100 | 2,955 | 1,280 | 30 |
| 200 | 3,275 | 1,130 | 26 |
| 300 | 2,560 | 765 | 23 |

EXAMPLE 16

Two cottonseed flour media of increasing strength were prepared as follows:

| | Grams per liter | |
|---|---|---|
| | Medium A | Medium B |
| Starch | 45.0 | 60 |
| CaCO$_3$ | 10.5 | 14 |
| NH$_4$Cl | 1.5 | 2 |
| Cottonseed flour | 45.0 | 60 |
| Yeast | 1.5 | 2 |

To these media were added, in separate runs, varying amounts of CuSO$_4$.5H$_2$O. The media were dispensed in appropriate amounts into flasks containing 3% (v./v.) of lard oil, sterilized, inoculated with a vegetative inoculum of S. aureofaciens (Strain ED–2047) and incubated on a rotary shaker at 25° C. for 160 hours. Harvest mash assays were as follows:

Table 16

| CuSO₄.5H₂O p.p.m. | Medium A | | | Medium B | | |
|---|---|---|---|---|---|---|
| | DMCTC γ/ml. | DMTC γ/ml. | Percent DMTC | DMCTC γ/ml. | DMTC γ/ml. | Percent DMTC |
| 100 | 5,135 | 815 | 14 | 3,080 | 1,510 | 33 |
| 200 | | | | 3,825 | 1,585 | 29 |
| 300 | | | | 4,725 | 1,705 | 27 |
| 400 | | | | 5,490 | 1,660 | 23 |
| 500 | | | | 5,480 | 1,540 | 22 |

It will be seen that when the medium strength is increased by 25% (Medium B) the level of demethylchlortetracycline produced falls off. However, this effect can be reversed and good levels of demethylchlortetracycline obtained by the addition of copper as indicated.

EXAMPLE 17

Two soybean oil media of increasing strength were made up as follows:

| | Grams per liter | |
|---|---|---|
| | Medium A | Medium B |
| Starch | 40.0 | 45.0 |
| CaCO₃ | 9.0 | 10.5 |
| NH₄Cl | 1.3 | 1.5 |
| Soybean oil meal | 40.0 | 45.0 |
| Yeast | 1.3 | 1.5 |

To these media were added, in separate runs, varying amounts of CuSO₄.5H₂O. The media were dispensed in appropriate amounts into flasks containing 3% (v./v.) of lard oil, sterilized, inoculated with a vegetative inoculum of *S. aureofaciens* (Strain ED–2047) and incubated on a rotary shaker at 25° C. for 160 hours. Harvest mash assays were as follows:

Table 17

| CuSO₄.5H₂O p.p.m. | Medium A | | | Medium B | | |
|---|---|---|---|---|---|---|
| | DMCTC γ/ml. | DMTC γ/ml. | Percent DMTC | DMCTC γ/ml. | DMTC γ/ml. | Percent DMTC |
| 300 | 3,520 | 1,710 | 33 | 2,470 | 1,730 | 41 |
| 400 | 3,685 | 1,635 | 30 | 2,970 | 1,890 | 39 |
| 500 | 3,090 | 1,515 | 33 | 2,900 | 1,830 | 39 |
| 700 | 2,635 | 1,185 | 31 | 3,180 | 1,705 | 35 |

This application is a continuation-in-part of my copending application, Serial. No. 832,134, filed August 7, 1959, now abandoned, which application, in turn, is a continuation-in-part of my copending application, Serial No. 671,407, filed July 12, 1957, now abandoned.

I claim:

1. The process of producing chlortetracycline by aerobic fermentation of an aqueous fermentation medium with a strain of *S. aureofaciens* which will produce both tetracycline and chlortetracycline which comprises carrying out the fermentation in the presence of from about 200 to about 1000 parts per million copper so as to increase the chlortetracycline production and to decrease the tetracycline production.

2. The process of producing chlortetracycline by aerobic fermentation of an aqueous fermentation medium with a strain of *S. aureofaciens* which will produce both tetracycline and chlortetracycline which comprises carrying out the fermentation in the presence of from about 200 to about 1000 parts per million of a copper salt so as to increase the chlortetracycline production and to decrease the tetracycline production.

3. The process according to claim 2 in which the copper salt is CuSO₄.5H₂O.

4. The process of producing demethylchlortetracycline by aerobic fermentation of an aqueous fermentation medium with a demethylchlortetracycline-producing strain of *S. aureofaciens* which comprises carrying out the fermentation in the response of from about 30 to about 1000 parts per million of copper so as to increase the demethylchlortetracycline production and to decrease the demethyltetracycline production.

5. The process of producing demethylchlortetracycline by aerobic fermentation of an aqueous fermentation medium with a demethylchlortetracycline-producing strain of *S. aureofaciens* which comprises carrying out the fermentation in the presence of from about 30 to about 1000 parts per million of a copper salt so as to increase the demethylchlortetracycline production and to decrease the demethyltetracycline production.

6. The process according to claim 5 in which the copper salt is CuSO₄.5H₂O.

References Cited in the file of this patent

UNITED STATES PATENTS 2,609,329    Niedercorn _____ Sept. 2, 1952

OTHER REFERENCES

Sekizowa: Journal of Biochemistry, vol. 42, No. 2, March 1955, pages 217–219.